United States Patent [19]

Hertel

[11] 4,306,876
[45] Dec. 22, 1981

[54] AQUEOUS DISPERSIONS OF PRIMARY AROMATIC AMINES, THEIR USE FOR THE PRODUCTION OF WATER-INSOLUBLE AZO DYES ON THE FIBER AND THE USE OF AN ANIONIC SURFACTANT FOR THE MANUFACTURE OF SAID DISPERSIONS

[75] Inventor: Hasso Hertel, Mühlheim, Fed. Rep. of Germany

[73] Assignee: Hoechst Aktiengesellschaft, Fed. Rep. of Germany

[21] Appl. No.: 128,263

[22] Filed: Mar. 7, 1980

[30] Foreign Application Priority Data

Mar. 12, 1979 [DE] Fed. Rep. of Germany ....... 2909639

[51] Int. Cl.$^3$ .......................... D06P 1/12; D06P 67/00
[52] U.S. Cl. ........................................ 8/527; 8/589; 8/610; 8/666
[58] Field of Search .................... 8/527, 666, 610, 589

[56] References Cited

U.S. PATENT DOCUMENTS

| | | | |
|---|---|---|---|
| 3,563,686 | 2/1971 | Arm et al. | 8/666 |
| 3,961,884 | 6/1976 | Hertel et al. | 8/666 |
| 3,990,985 | 11/1976 | Hertel | 8/664 |
| 4,078,887 | 3/1978 | Kostka et al. | 8/527 |
| 4,249,902 | 2/1981 | Kruckenberg et al. | 8/525 |

FOREIGN PATENT DOCUMENTS

| | | |
|---|---|---|
| 867749 | 12/1978 | Belgium . |
| 2751784 | 5/1979 | Fed. Rep. of Germany . |
| 2801317 | 7/1979 | Fed. Rep. of Germany . |

*Primary Examiner*—A. Lionel Clingman
*Attorney, Agent, or Firm*—Connolly and Hutz

[57] ABSTRACT

An anionic surfactant can be used for the preparation of aqueous dispersions of specific composition with a high degree of fineness of the particle sizes of primary aromatic amines free from carboxylic acid or sulfonic acid groups. Besides said aromatic amine and said anionic surfactant these aqueous dispersion contain as a dispersing agent a water-soluble condensation product containing one or several radicals of oxalkylated, hydroxy and/or carboxy group-containing aromatic compounds, which radicals are linked with one another by methylene bridges either directly or via radicals of aromatic compounds. The dispersions may further contain a polyhydric alcohol and optionally a high molecular weight polyglycol. The dispersions have a good viscosity behavior, a good stability in storage and are stable at temperatures of about $-15°$ to $+50°$ C. They can be readily and rapidly diazotized and yield residue-free diazonium salt solutions with low tendency to foam formation. The dispersion and the diazonium salt solutions produced therefrom can be readily used for the production of water-insoluble azo dyes on the fiber, for example in ice-color technique.

12 Claims, No Drawings

AQUEOUS DISPERSIONS OF PRIMARY AROMATIC AMINES, THEIR USE FOR THE PRODUCTION OF WATER-INSOLUBLE AZO DYES ON THE FIBER AND THE USE OF AN ANIONIC SURFACTANT FOR THE MANUFACTURE OF SAID DISPERSIONS

This invention relates to aqueous dispersions of primary aromatic amines which are preferably used for the production of water-insoluble azo dyes on the fiber, especially in ice-color technique.

U.S. Pat. No. 3,990,985 describes stable, storable and aqueous dispersions of primary aromatic amines which contain as dispersing agent a water-soluble condensation product with one or several radicals of oxalkylated aromatic compounds containing hydroxy and/or carboxy groups, which oxalkylated aromatic radicals are linked with one another via methylene bridges either directly or via radicals of aromatic compounds. The dispersions may additionally contain a polyhydric alcohol. As regards the degree of fineness of particle size of the primary aromatic amines and the viscosities of the aqueous dispersions, they have certain drawbacks. In a temperature range of from 40° to 50° C. aqueous dispersions of some amines of this type have a strongly increased viscosity up to an ointment-like consistency, thereby involving problems in the manufacture and trouble in the course of production.

The present invention provides stable, storable and aqueous dispersions of primary aromatic amines which contain the aforesaid dispersing agent and optionally a polyhydric alcohol and which do not have the aforesaid disadvantages. They are characterized by better viscosity properties, an improved fineness of the aromatic amine, a good stability in storage and stability in a temperature range of from about −15° C. to about +50° C. Moreover, they are easy to diazotize and yield diazonium salt solutions having a low tendency to foam and being free from residue, which solutions have a high stability and are well suitable for the different dyestuff manufacturing processes. The dyeings obtained with the use of the diazotized dispersions of the invention are very level and have good fastness properties.

The improved dispersions of the invention are characterized by a content of an anionic surfactant and, optionally a polyglycol.

The present invention, therefore, provides stable, storable, aqueous dispersions of primary aromatic amines free from carboxylic acid or sulfonic acid groups, which contain as dispersing agent a water-soluble condensation product with one or several, for example 2 to 6, radicals of oxalkylated aromatic compounds containing hydroxy and/or carboxy groups, which oxalkylated aromatic radicals are linked with one another by methylene bridges either directly or via radicals of aromatic compounds, and which dispersions contain, as the feature of the invention, an anionic surfactant preferably having two or more sulfo groups in the molecule. These dispersions may contain additionally a high molecular-weight polyglycol and a polyhydric alcohol.

The dispersions of the invention do have the advantageous properties even with a concentration of primary aromatic amine of 30% by weight and more. For use in the technical field for the manufacture of developing baths, printing pastes and padding liquors, the dispersions of the invention are normally adjusted to a concentration of 35 to 70% by weight.

The dispersions of the invention preferably contain 0.3 to 8% by weight, and more preferably 0.8 to 2% by weight, calculated on the dispersion, of anionic surfactant.

Suitable anionic surfactants that can be contained in the dispersions of the invention are, for example, fatty acids, fatty acid sarcosides, fatty acid isothionates, fatty acid lactylates, alkyl malonates, alkyl succinates, protein-fatty acid-condensation products, alkyl sulfonates, fatty acid taurides, fatty acid methyl taurides, fatty acid sulfonates, sulfosuccinic acid esters, alkylbenzene sulfonates, alkylnaphthalene sulfonates, sulfated alcohols, sulfated fatty acids, sulfated polyglycol ethers, sulfated fatty acid esters, sulfated fatty acid amides, alkyl-sulfonyl aminocarboxylic acids, lignin sulfonates, sulfonated phenol-formaldehyde resins (the term "phenol" including phenolic aromatic compounds such as phenol, cresol, methoxyphenol and naphthol), sulfonated phenol-formaldehyde-naphthalene sulfonic acid resins, and condensation products from napthalene-sulfonic acids and formaldehyde as well as polyvinyl acetal sulfonates.

Preferred anionic surfactants in the dispersions of the invention are lignin sulfonates having an average molecular weight of about 5,000 to 100,000 sulfo group-containing phenol or cresol-formaldehyde addition products (resins) preferably having on the average from 0.3 to 2 sulfo groups per aromatic radical, and naphthalene-sulfonic acid-formaldehyde condensation products of the dinaphthylmethane type.

Surfactants and dispersing agents of the mentioned types are well known from literature.

High molecular weight polyglycols optionally contained in the dispersions of the invention and serving to increase the viscosity thereof are preferably polyethylene glycols having a molecular weight of from 4,000 to 100,000, more preferably from 8,000 to 30,000. They do not influence the degree of fineness of dispersion of the amine and the viscosity properties of the dispersion at elevated temperature. They are contained in the dispersions in an amount of from 0.5 to 15% by weight, preferably 1 to 5% by weight.

Suitable polyhydric alcohols which may be additionally contained in the dispersions of the invention are especially lower alkane-diols or -triols preferably having 2 to 5 carbon atoms, such as ethylene glycol, propylene glycol, butylene glycol, or glycerol.

As dispersing agent the dispersions of the invention preferably contain water-soluble aromatic formaldehyde condensation products having aromatic radicals linked via methylene bridges and at the aromatic radicals at least one oxalkylated hydroxy and/or carboxy group with a terminal hydroxy or lower alkyl ether group. Preferred dispersing agents are water-soluble condensation products which can be obtained by reaction of a phenolic, optionally etherified (for example, by lower alkyl), aromatic compound or of an aromatic hydrocarbon capable of reacting with formaldehyde, for example compounds of the group (A) listed below, with formaldehyde and a water-soluble addition product of 8 to 50 moles of alkylene oxide, preferably ethylene oxide or propylene oxide, on 1 mol of an aromatic, phenolic hydroxy group-containing compound, for example those of the group (B) listed below, in the presence of an acid catalyst and optionally with subsequent alkylation, such as methylation or ethylation. Compounds of the group (A) are phenol, cresol, xylenol, resorcinol, butylphenol, chlorophenol, naphthol, methylnaphthol, 4,4′-dihydroxydiphenyl, anisole, xylene, mesitylene, naphthalene and addition-products of 2 to 50 mols of ethylene oxide on 1 mol of a phenol compound, and compounds of the group (B) are mono- or dihydric phenol-compounds, naphthols, methylene-di-β-naphthol and 2,2′-dihydroxydiphenylpropane.

Especially suitable dispersing agents are condensation products obtained by reaction of a phenol compound, preferably phenol or cresol, a phenol polyglycol ether and formaldehyde; these condensation products may contain free hydroxy groups which also may have been wholly or partially alkylated; especially the phenolic radicals of the condensation product may be substituted by methyl or ethyl. Particularly good dispersions are those which contain a water-soluble dispersing agent obtained by acid condensation of 1 mol of phenol, 2 mols of formaldehyde and approximately 1 mol of the addition product of 10 to 30 mols of ethylene oxide on 1 mol of phenol or naphthol with subsequent reaction with dimethyl sulfate or diethyl sulfate.

Especially preferred are dispersing agents of the formula (1)

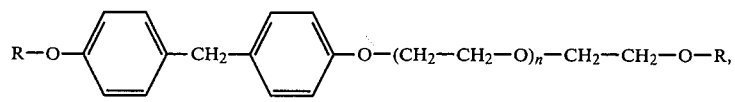

(1)

in which R is hydrogen or methyl or ethyl and n is an integer from 8 to 50, preferably from 10 to 30, especially 14 to 26.

The aqueous dispersions of the invention are preferably produced by mixing the primary aromatic amine with the dispersing agent as specified above, and optionally with a polyhydric alcohol and a polyglycol and with the anionic surfactant to obtain a paste. The amines are used either in powder form or in the form of filter cakes as obtained in the industrial manufacture of such amines containing on the average about 15 to 25% by weight of water. The filter cake is mixed by stirring with about 5 to 40% by weight of the dispersing agent, preferably 15 to 20% by weight thereof (each time calculated on pure amine) and with the anionic surfactant and optionally the polyhydric alcohol and polyglycol. With regard to the technical use of the dispersions, the aromatic amine is used in such an amount that the dispersion contains at least 30% by weight thereof, preferably 40 to 65% by weight. The polyhydric alcohol which may be contained in the dispersions of the invention is used in an amount of up to about 20% by weight.

The pastes obtained are subjected to fine-dispersion processing of the primary aromatic amine whereby dispersions of low viscosity are obtained. For this processing of the amines ball milling can be used, for example, in a roller mill filled with balls. It is likewise possible to operate in an oscillating mill, in which case considerably shorter milling times are sufficient. Agitator ball mills or a sand mill containing Ottawa sand proved to be especially suitable. In milling devices of these types a high fineness can be obtained at a high throughput. Other substances may be added to the dispersions prior to, during or after milling to modify the properties of the dispersions. For example, if desired, the viscosity of the dispersion can be increased by adding a polyglycol having a molecular weight of from 4,000 to 100,000, or the tendency to foaming of some anionic surfactants can be suppressed by adding a defoamer.

To avoid the formation of mould fungi during a prolonged storage of the dispersions small amounts of a fungicide, for example sodium pentachlorophenol, can be added.

The degree of fineness of dispersions can be measured by sedimentation analysis which yields absolute values. Because of the very high solubility of the amines used, compared with that of water-insoluble dyestuffs with which this measurement is practized, this complicated method gives, however, faulty results so that it is not recommended in the present case. Instead the so-called flow test is used (cf. for example H. Leube and H. Uhrig, Textilveredlung 9, pages 97 to 106 (1974)) which, inspite of the simple and rapid performance, furnishes very differentiated values of the degree of fineness. To measure the fineness, the dispersion is diluted with distilled water to a content of primary aromatic amine of about 1% by weight, and 1 cc of the diluted dispersion is given onto the center part of a round filter placed on a beaker having a slightly smaller diameter. The sample is absorbed wholly or substantially by the filter paper, the rest drops into the beaker. In the case of the individual particles of the dispersion being distinctly smaller than the filter pores, the sample migrates in the paper as a genuine solution. With a colored amine a substantially uniformly colored circle is formed. If the individual particles of the dispersion are greater than the filter pores, they are withheld in the center area where they are visible as a stain, and only the liquid phase freed from the amine migrates in the filter paper. With a fineness between these two extremes, the finer solid particles are transported by the migrating liquid phase more or less far according to their size—which means a more or less extended migration, hereinafter called "drift"—while the coarse particles remain within the point of application, so that more or less pronounced zones of migrating solution and more or less withheld particles are formed. For this test the porosity of the filter paper used is, of course, very important although no numerical conclusion can be drawn from the pore size to the particle size. Filter papers no. 589/1 and no. 589/2 of Messrs. Schleicher & Schüll, for example, cover the range in question. Paper no. 589/2 is more dense than the other one. When these filter papers are used to measure the fineness of the dispersions of the invention the drift is complete in most cases on filter paper no. 589/1, that is to say the point of application does not differ from the environment and a substantially uniformly colored circle is formed (dispersions of colorless amines are judged by looking through). On filter paper no 589/2 such a borderless drift can be observed very seldom only; in most cases a more or less pronounced center portion is formed which is surrounded by a weaker circular zone. (The result should be evaluated after drying in air at room temperature).

The aqueous dispersions of the invention are very stable. The primary aromatic amine is contained therein in such a fineness that no sedimentation thereof can be observed even after prolonged storage. Even with concentrations of the amine(s) of above 50% to about 65% by weight, the dispersions are so thin that they can be easily incorporated by stirring into a dye bath or bath preparation. The dispersions can be used advantageously for the manufacture of developing baths, padding liquors or of print pastes for base-printing or for printing on fabrics that have been prepadded with naphthol compounds as used in ice-color technique and with an alkali metal nitrite. The primary aromatic amine contained in the dispersion of the invention is diazotized in simple manner by mixing the dispersion with the required amount of sodium nitrite solution and adding this mixture while stirring to hydrochloric acid of about 2 to 6% strength by weight and having a temperature of 20° C. or below. The diazotization is terminated after approximately 1 minute and a residue-free diazonium salt solution is obtained. Alternatively, the diazotization can be carried out in a manner such that the dispersion is first stirred with water of 20° C. or below, next the hydrochloric acid and then the nitrite solution are added. According to another mode of diazotization, which leads to an equally good result, first the amine dispersion and then the aqueous solution of alkali metal nitrite are added, while stirring, to a mixture of water and hydrochloric acid preferably having a temperature below 20° C.

Suitable primary aromatic amines contained in the dispersions of the invention are aromatic amines which do not contain carboxy and/or sulfonic acid groups. Amines of this type are, for example, amino compounds normally used in ice-color technique, which are, for example, listed in Colour Index, 3rd edition, volume 4 with C.I.-Nos. 37,000 to 37,275, and in L. Diserens, Die neuesten Fortschritte in der Anwendung der Farbstoffe, 3rd edition, 1951, Volume 1, pages 646 to 685. Thus, the primary aromatic amines may belong to the benzene, azobenzene, diphenyl, diphenylamine, naphthalene, or anthracene series. Aromatic benzoheterocyclic amines and aromatic heterocyclic amines that behave like aromatic amines in the diazotization, are also suitable.

Preferred primary aromatic amines contained in the dispersions of the invention are compounds of the formula (2)

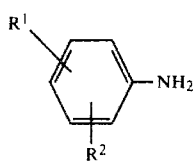

(2)

in which $R^1$ is hydrogen, halogen, for example chlorine, alkoxy having from 1 to 6 carbon atoms, for example methoxy or ethoxy, alkyl having from 1 to 6 carbon atoms, for example methyl or ethyl, a sulfonic acid amide group unsubstituted or mono- or disubstituted by alkyl of from 1 to 4 C-atoms, a carboxylic acid amide group unsubstituted or mono- or disubstituted by alkyl of from 1 to 4 C-atoms, an acylamino group of a lower aliphatic or aromatic carboxylic acid, for example acetylamino, propionylamino, or benzoylamino, or is a cyano group, a phenylamino group, or a phenylazo or naphthylazo group, the two latter radicals may be substituted by substituents selected from the group of nitro, halogen, for example chlorine, alkoxy having from 1 to 6 carbon atoms, for example methoxy and ethoxy, alkyl having from 1 to 6 carbon atoms, for example methyl and ethyl, sulfonic acid amide unsubstituted or mono- or di-substituted by alkyl of from 1 to 4 C-atoms, carboxylic acid amide unsubstituted or mono- or disubstituted by alkyl of from 1 to 4 C-atoms, acylamino of a lower aliphatic carboxylic acid or aromatic carboxylic acid such es mentioned aove, cyano, amino and phenylamino, and $R^2$ is hydrogen, halogen, for example chlorine, nitro, alkoxy having from 1 to 6 carbon atoms, for example methoxy or ethoxy, or alkyl having from 1 to 6 carbon atoms, for example methyl or ethyl.

The water-soluble dispersing agent contained in the dispersions of the invention can be prepared by condensing aromatic compounds capable of reacting with formaldehyde with water-soluble addition products of alkylene oxides on aromatic compounds containing hydroxy and/or carboxylic acid groups, and with formaldehyde in the presence of an acid catalyst and optionally alkylating or oxalkylating the condensation products in known manner with an alkylation agent such as a dialkyl sulfate or an alkylene oxide. Alternatively, the dispersing agent can be prepared by pre-condensing the aromatic compounds, specified above and capable of reacting with formaldehyde, with formaldehyde and then condensing the pre-condensation products obtained with water-soluble addition products of alkylene oxides on aromatic compounds containing hydroxy and/or carboxylic acid groups in the presence of an acid catalyst.

Aromatic compounds capable of reacting with formaldehyde and suitable for making the water-soluble dispersing agents to be used according to the invention are, above all, compounds containing hydroxy groups linked to the aromatic nucleus, which hydroxy groups may be etherified, preferably by lower alkyl, furthermore addition products of 2 to 50 mols of ethylene oxide on 1 mol of an aromatic phenolic compound as well as hydrocarbon compounds which are capable of reacting with formaldehyde. Such aromatic compounds capable of reacting with formaldehyde are, for example, phenol, cresol, xylenol resorcinol, butylphenol, chlorophenol, naphthol, methylnaphthol, 4,4'-dihydroxydiphenyl, anisole, addition products of 2 to 50 mols of ethylene oxide on 1 mol of a phenol compound, as well as the hydrocarbons xylene, mesitylene and naphthalene.

Suitable water-soluble addition products of alkylene oxides on aromatic compounds containing hydroxy and/or carboxylic acid groups are, in the first place, reaction products of 8 to 50 mols of alkylene oxide, preferably ethylene oxide and/or propylene oxide, on 1 mol of aromatic compound containing hydroxy and/or carboxylic acid groups. Such aromatic compounds containing one or several hydroxy and/or carboxylic acid groups are, for example, mono- or dihydric phenolcompounds such as phenol, cresol, xylenol, butylphenol, chlorophenol, α-naphthol, β-naphthol, resorcinol, 2,2'-dihydroxydiphenyl propane, 4,4'-dihydroxydiphenyl and methylene di-β-naphthol.

The following examples illustrate the invention, the parts and percentages are by weight unless otherwise stated and the relationship of parts by weight to parts by volume is the same as that of kilogram to liter.

EXAMPLE 1

135 Parts of 4-chloro-2-nitro-1-aminobenzene, 90 parts of a 38% aqueous solution of an aftermethylated condensation product of 1 mol of phenol, of about 1 mol of phenol polyglycol ether with about 18 ethylene oxide units and of about 2 mols of formaldehyde, 3 parts of a sulfo groups-containing cresol-formaldehyde resin and 71 parts of water are mixed while stirring. In a rapid agitator ball mill the mixture is then milled for 30 minutes.

TEST

To determine the fineness 1 part of the dispersion is diluted with 33 parts of distilled water. 1 ml each of the diluted dispersion is dropped with pipet on the center of a round filter having a diameter of 11 cm, of paper no. 589/1 and 589/2 made by Messrs. Schleicher & Schüll. After the drift of the sample and drying, an almost uniformly colored circle is visible on filter paper no. 589/1. O$_n$ filter paper no. 589/2 the central portion of the circle is more intensely colored than the outer portion of the circle.—With a comparative dispersion, prepared as described above but without the addition of the sulfo groups-containing cresol-formaldehyde resin as anionic surfactant, the total amount of amine is held back by the filter paper at the points of application, which is intensely colored while the rest of the paper remains practically uncolored.

For the viscosity test a sample each of the two preparations is placed in a water bath of 50° C. The preparation which does not contain the surfactant acquires a pasty consistency after a few minutes while the viscosity of the preparation of the invention remains almost unchanged and it keeps the good flow properties even at 50° C.

EXAMPLE 1a

For some applications the viscosity of the dispersion which accords to the invention and is described in the instant Example 1, is too low. It can be increased by adding 3% of a polyglycol ether having an average molecular weight of 20,000. The fineness of the primary aromatic amine in the dispersion and the viscosity behavior at elevated temperatur are not influenced by this addition. The polyglycol ether can be added prior to or during milling.

EXAMPLE 2

The dispersion is prepared as described in Example 1 with the exception that 1 part, 1.5 parts, 2 parts, 6 parts, 9 parts and 12 parts of resin are added instead of 3 parts of the sulfo groups-containing cresol-formaldehyde rsin and the amount of water is reduced accordingly. In the preparations obtained the primary aromatic amine has practically the same fineness as in Example 1. On filter paper no. 589/1 the circle has an almost uniform coloration while on filter paper no. 589/2 the zone of application is a little more intensely colored.

EXAMPLE 3

The dispersion is prepared as described in Example 1 with the exception that 3 parts of a lignin sulfonate having an average molecular weight of 14,000 to 16,000 is added instead of 3 parts of the sulfo groups-containing cresol-formaldehyde resin. The preparation obtained has practically the same fineness as the dispersion of Example 1, as can be demonstrated by the filter tests which are practically identical with those of Example 1. The viscosity behavior corresponds to that of the dispersion of Example 1. A viscosity increase of the dispersion by addition of polyglycol ether does not influence the fineness and the viscosity behavior of the dispersion at elevated temperature.

EXAMPLE 4

A dispersion is prepared as described in Example 1 with the exception that 6 parts of the sodium salt of naphthalene trisulfonic acid are added instead of 3 parts of anionic surfactant as used in Example 1 and the amount of water is reduced accordingly. In the dispersion obtained the primary aromatic amine has a considerably higher fineness than in a comparative dispersion without addition of the anionic surfactant. With this comparative dispersion the total amount of amine is withheld at the point of application analogously to the comparative dispersion of Ex. 1, whereas the flow test of the dispersion according to the invention on filter paper no. 589/1 shows a drift with a minor zone formation, i.e. the center portion is colored a little more only than the outskirt, and on filter paper no. 589/2 a distinct center portion can be seen which is surrounded by a weaker circular outer zone.

EXAMPLE 5

135 Parts of 4-chloro-2-nitro-1-aminobenzene, 60 parts of an about 38% aqueous solution of an after-methylated condensation product of 1 mol of phenol, of about 1 mol of phenol glycol ether with about 25 ethylene oxide units and of about 2.5 mols of formaldehyde, 12 parts of the sodium salt of a methylene-bis-naphthalene-sulfonic acid, 0.2 parts of sodium pentachlorophenol and 93 parts of water are finely milled as described in Example 1.

The flow test on filter paper no. 589/1 shows a drift without zone formation, i.e. a circle of substantially uniform color, whereas on paper no. 589/2 a distinctly visible center portion can be seen. With a comparative dispersion prepared in the same manner but without use of the anionic surfactant, no drift can be observed in the flow test; there is only a center stain withholding the total amount of amine at the point of application. Hence, this dispersion has a much lesser fineness.

EXAMPLE 6

A dispersion is prepared as described in Example 1 with the exception that the anionic surfactant used in said example is replaced by 9 parts of the sodium salt of a methylene-bis-naphthalenesulfonic acid. The dispersion obtained has almost the same fineness as the dispersion of Example 1 and the flow tests are practically identical.

EXAMPLE 7

A dispersion is prepared as described in Example 1 with the exception that the anionic surfactant used in said example is replaced by 3 parts of the sodium salt of dodecylbenzenesulfonic acid. To suppress foam formation 0.5 part of a commercial silicone defoamer is added and the amount of water is reduced accordingly. The fineness of the dispersion obtained is much better than that of a comparative dispersion prepared in the same manner but without addition of the anionic surfactant. The filter withholds the total amount of the primary aromatic amine of the surfactant-free dispersion at the point of application, while a very weak zone formation can be observed with the dispersion of the invention on filter paper no. 589/1, i.e. a little pronounced center portion in an otherwise uniformly colored area; on filter paper no. 589/2 a small drift zone is formed around a center zone.

EXAMPLE 8

A dispersion is prepared as described in Example 1 with the exception that the anionic surfactant used in said example is replaced by 3 parts of the sodium salt of dibutyl-naphthalene-sulfonic acid. To reduce foam formation 0.5 part of a 50% solution of triisobutyl phosphate in isobutanol is added. The fineness and viscosity behavior of the dispersion obtained correspond to those of the dispersion of Example 1.

EXAMPLE 9

4,500 g of 5-chloro-2-amino-1,4-dimethoxybenzene, 2,500 g of an about 40% aqueous solution of an aftermethylated condensation product of 1 mol of phenol, of about 1 mol of phenol polyglycol ether with about 16 ethylene oxide units and of about 1.5 mol of formaldehyde, 100 g of a sulfo groups-containing cresol-formaldehyde resin, 600 g of ethylene glycol, 20 g of sodium pentachlorophenol and 700 g of water are thoroughly mixed and the mixture is pumped 5 times through an agitator mill at a rate of about 5 kg/hr.

The fineness of the dispersion is determined as described in Example 1. No zones can be perceived on filter paper no. 589/1, i.e. the drift is absolutely uniform. On filter paper no. 589/2 the point of application is just visible as center stain.—With a comparative dispersion prepared without use of an anionic surfactant, the flow test on filter paper no. 589/1 shows the formation of very distinct zones, while practically the total amount of solid is withheld by filter paper no. 589/2 at the point of application.

As agitator ball mill there can be used in this and in the other examples a mill with a milling can content of 1 to 1.5 liters and containing 1 to 2 kilograms of siliquartzite beads 1 to 3 mm in diameter.

The circumferential speed of the disks moving the beads and the material to be milled should be about 8 meters per second.

When the dispersion of the invention and the comparative dispersion prepared without anionic surfactant are placed in a water bath of 50° C., the dispersion without surfactant becomes pasty while the dispersion of the invention remains readily pourable at that temperature.

EXAMPLE 10

135 parts of 2-amino-1-methoxybenzene-4-sulfonic acid diethyl amide, 60 parts of an about 38% aqueous solution of an aftermethylated condensation product of 1 mol of phenol, of about 1 mol of phenol polyglycol ether with about 20 ethylene oxide units and of about 2 mols of formaldehyde, 6 parts of a sulfo groups-containing cresol-formaldehyde resin as anionic surfactant, 30 parts of ethylene glycol, 0.5 part of sodium pentachlorophenol and 75 parts of water are mixed and the mixture is milled for 30 minutes as described in Example 1.

In the flow test on filter paper no. 589/1 the dispersion shows an absolutely uniform drift, on filter paper no. 589/2 the drift is smaller with a very distinct center zone. A comparative dispersion prepared in the same manner but without anionic surfactant does not show any drift of the amine at the point of application.

In the dispersion of the invention the ethylene glycol can be replaced by the same amount of glycerol without the fineness being affected.

EXAMPLE 11

142 Parts of 5-nitro-2-amino-1-methoxybenzene, 56 parts of an about 38% aqueous solution of an aftermethylated condensation product of 1 mol of phenol, of about 1 mol of phenol polyglycol ether with about 20 ethylene oxide units and of about 2 mols of formaldehyde 3 parts of a sulfo groups-containing cresol-formaldehyde resin, 50 parts of ethylene glycol, 0.5 part of sodium pentachlorophenol and 52 parts of water are mixed and the mixture is milled as described in Example 1.

In the flow test on filter paper no. 589/1 the dispersion shows a drift without zones, on filter paper no. 589/2 a very distinct center stain can be observed surrounded by a weaker circular zone. With a comparative dispersion prepared in the same manner but without anionic surfactant the flow test gives the same result as the comparative dispersion of Example 1.

When in the dispersion of the invention the dispersing agent is replaced by an equivalent afterethylated condensation product, a dispersion of the same quality and with the same properties is obtained.

EXAMPLE 12

150 Parts of 4-chloro-2-nitroaniline, 90 parts of an about 38% aqueous solution of an aftermethylated condensation product of 2 mols of phenol, of about 1 mol of phenol polyglycol ether with about 22 ethylene oxide units and of about 3 mols of formaldehyde, 12 parts of a 22% aqueous solution of a polyvinyl acetal sulfonate as anionic surfactant, 40 parts of ethylene glycol and 23 parts of water are mixed and milled as described in Example 1.

In the flow test the dispersion obtained shows a complete drift without zones on filter paper no. 589/1. A comparative dispersion prepared without use of the anionic surfactant shows no drift on filter paper no. 589/1 and withholds the amine at the point of application in the same manner as the comparative dispersion of Example 1.

EXAMPLE 13

A dispersion is prepared as described in Example 1 with the exception that 5-nitro-2-amino-1-methylbenzene is used instead of 4-chloro-2-nitro-1-aminobenzene. The dispersion obtained has a distinctly better fineness than a comparative dispersion according to U.S. Pat. No. 3,990,985 prepared without addition of a sulfo groups-containing cresol-formaldehyde resin as anionic surfactant.

EXAMPLE 14

135 Parts of 4-amino-2',3-dimethyl-azobenzene, 45 parts of an about 60% aqueous solution of an aftermethylated condensation product of 1 mol of phenol, of 0.9 to 1.1 mols of phenol polyglycol ether with 18 to 22 ethylene oxide units and of 1.9 to 2.2 mols of formaldehyde, 3 parts of a sulfo group-containing cresol-formaldehyde resin, 0.2 part of sodium pentachlorophenol, 26 parts of monoethylene glycol and 90 parts of water are thoroughly mixed and the mixture is milled as described in Example 1.

The dispersions remains in pourable condition when heated to 50° C., while a dispersion prepared without the sulfo groups-containing cresol-formaldehyde resin as anionic surfactant becomes pasty under the same conditions.

EXAMPLE 14a

With an equally good result dispersions are obtained under the conditions of Example 14 when 4'-nitro-4-amino-2,5-dimethoxy-azobenzene or 4,4'-diamino-3-methoxy-6-methyl-azobenzene or 2'-chloro-4-amino-2,5-dimethoxy-azobenzene is used instead of the aromatic amine of said Example.

EXAMPLE 15

A dispersion is prepared as described in Example 1 with the exception that the amount of water is reduced from 71 parts to 28 parts. The dispersion obtained has a higher content of aromatic amine but the same fineness as the dispersion of Example 1.

EXAMPLE 15a

A dispersion having a lower content of aromatic amine can easily be obtained in the manner specified in Example 1 by using, instead of 71 parts of water, for example 177 parts of water. The dispersion obtained has likewise a good viscosity behavior and a high degree of fineness of the dispersed aromatic amine.

EXAMPLE 16

141 Parts of 4-chloro-2-nitro-1-aminobenzene, 12 parts of an about 38% aqueous solution of an aftermethylated condensation product of 1 mol of phenol, of 0.9 to 1.1 mols of phenol polyglycol ether with 14 to 18 ethylene oxide units and of 1.9 to 2.2 mols of formaldehyde, 3 parts of a sulfo groups-containing cresol-formaldehyde resin as anionic surfactant, 0.1 part of a commercial fungicide and 144 parts of water are thoroughly mixed and the mixture is milled in a rapid agitator ball mill.

The dispersion obtained has a distinctly higher fineness than a corresponding preparation according to DE-OS 2,314,938 prepared without addition of the sulfo groups-containing cresol-formaldehyde resin.

The viscosity of the dispersion of the invention of this Example is too low for some applications. It can be increased by adding about 5% of a polyglycol ether having an average molecular weight of 20,000. The addition has no influence on the fineness of the primary aromatic amine and the viscosity behavior at elevated temperature. The polyglycol ether can also be added prior to or during milling.

What is claimed is:

1. An aqueous dispersion of a primary aromatic amine which does not contain a carboxylic acid or a sulfonic acid group, containing as a dispersing agent a water-soluble condensation product with one or several radicals of oxyalkylated hydroxy and/or carboxygroups containing aromatic compounds which oxalkylated aromatic radicals are linked with one another by methylene bridges either directly or via radicals of aromatic compounds, and containing an anionic surfactant.

2. An aqueous dispersion according to claim 1, wherein the aromatic amine is a compound of the formula

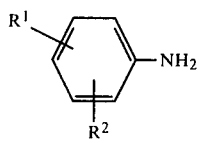

in which $R^1$ is hydrogen, halogen, alkoxy of from 1 to 6 carbon atoms, alkyl of from 1 to 6 carbon atoms, sulfonic acid amide unsubstituted or mono- or disubstituted by alkyl of from 1 to 4 carbon atoms, carboxylic acid amide unsubstituted or mono- or disubstituted by alkyl of from 1 to 4 carbon atoms, or is an acylamino group of a lower aliphatic or aromatic carboxylic acid, or is cyano, phenylamino, or is phenylazo unsubstituted or substituted by substituents selected from the group of nitro, halogen, alkoxy having from 1 to 6 carbon atoms, alkyl having from 1 to 6 carbon atoms, sulfonic acid amide unsubstituted or mono- or disubstituted by alkyl of from 1 to 4 carbon atoms, carboxylic acid amide unsubstituted or mono- or disubstituted by alkyl of from 1 to 4 carbon atoms, acylamino of a lower aliphatic carboxylic acid or aromatic carboxylic acid, cyano, amino and phenylamino, or is naphthylazo unsubstituted or substituted by substituents selected from the group of nitro, halogen, alkoxy having from 1 to 6 carbon atoms, alkyl having from 1 to 6 carbon atoms, sulfonic acid amide unsubstituted or mono- or disubstituted by alkyl of from 1 to 4 carbon atoms, carboxylic acid amide unsubstituted or mono- or disubstituted by alkyl of from 1 to 4 carbon atoms, acylamino of a lower aliphatic carboxylic acid or aromatic carboxylic acid, cyano, amino and phenylamino, and in which $R^2$ is hydrogen, halogen, nitro, alkoxy of from 1 to 6 carbon atoms or alkyl of from 1 to 6 carbon atoms.

3. A dispersion according to claim 1 wherein the dispersing agent is a condensation product obtained by reaction of a phenolic, optionally etherified, aromatic compound or of an aromatic hydrocarbon capable of reacting with formaldehyde, with formaldehyde and a water-soluble addition product of 8 to 50 mols of alkylene oxide on 1 mol of an aromatic, phenolic hydroxy group-containing compound in the presence of an acid catalyst and optionally with subsequent alkylation.

4. An aqueous dispersion according to claim 3 wherein the dispersing agent is a condensation product of a phenol-compound, of a phenol polyglycol ether and of formaldehyde.

5. An aqueous dispersion according to claim 4, wherein free hydroxy groups in the condensation product of a phenol, of a phenol polyglycol ether and of formaldehyde are wholly or partially alkylated.

6. An aqueous dispersion according to claim 5, wherein phenolic radicals of the condensation product are substituted by methyl or ethyl.

7. An aqueous dispersion according to claim 1 wherein the dispersing agent is a compound of the formula
in which R is hydrogen, methyl or ethyl and n is an integer of from 8 to 50.

8. An aqueous dispersion according to claim 1, wherein the anionic surfactant has at least two sulfo groups in the molecule.

9. An aqueous dispersion according to claim 1 or 8, wherein the anionic surfactant is a lignin sulfonate or a sulfo groups-containing phenol- or cresol-formaldehyde resin.

10. An aqueous dispersion according to claim 1 containing additionally a high-molecular weight polyglycol.

11. A dispersion according to claim 10 wherein the polyglycol is a polyethylene glycol having a molecular weight of from 4,000 to 100,000.

12. A dispersion according to claim 1 or 11 containing additionally a polyhydric alcohol.

* * * * *